(No Model.)
J. H. ROBERTSON.
ELECTRIC TELEPHONE.
No. 276,630.      Patented May 1, 1883.
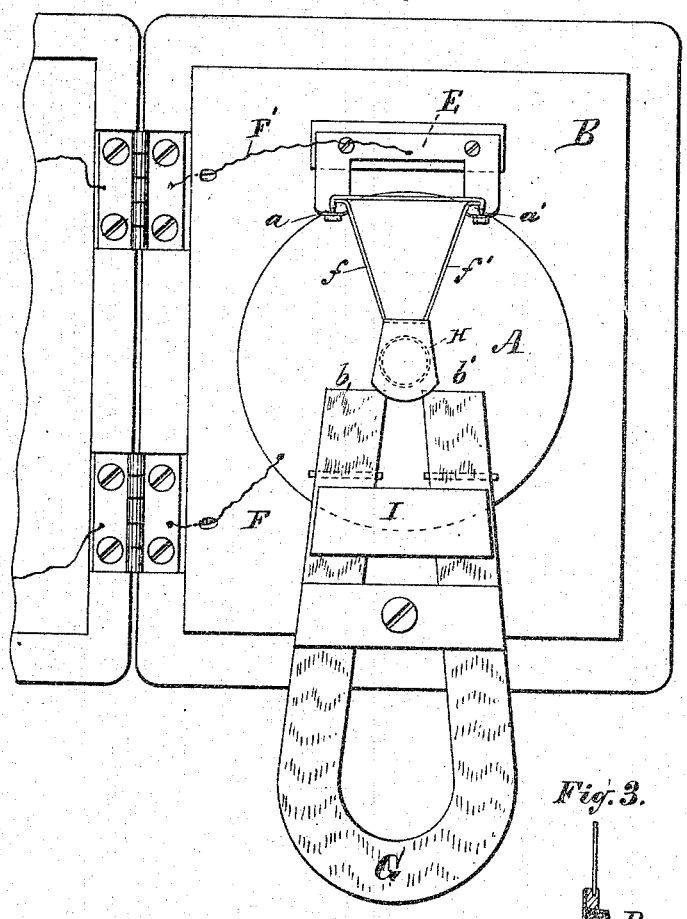
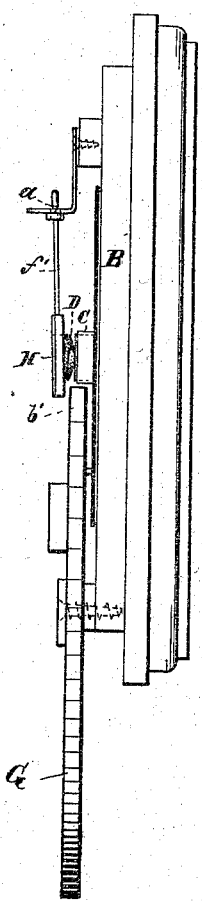
WITNESSES:
INVENTOR
James H. Robertson
BY
ATTORNEY

UNITED STATES PATENT OFFICE.

JAMES H. ROBERTSON, OF NEW YORK, N. Y.

ELECTRIC TELEPHONE.

SPECIFICATION forming part of Letters Patent No. 276,630, dated May 1, 1883.

Application filed August 16, 1882. (No model.)

*To all whom it may concern:*

Be it known that I, JAMES H. ROBERTSON, of the city of New York, in the county and State of New York, have invented a new and useful Improvement in Electric Telephones, of which the following is a specification, reference being had to the accompanying drawings, forming part of the same.

My invention relates to that class of electric-telephone transmitters in which the electric current passes through electrodes that are loosely in contact; and it consists in the devices hereinafter described and claimed, whereby magnetism is employed, instead of a spring or gravity, to produce contact-pressure of the electrodes, and whereby the magnetic force so employed may be adjusted at pleasure.

Figure of the drawings is a face view of the mech ni m of an ordinary telephone-transmitter with my improvement added. Fig. 2 is an edge iew of the same, and Fig. 3 is a detached view of one of the electrodes and a portion of the magnet.

A is the diaphragm. It is shown attached to the door B of a case, which, when closed, incloses the mechanism. The mouth-piece (not shown) is on the outer or opposite side of the door. The diaphragm is attached to the door at its perimeter, so as to leave it free to vibrate.

C is the fixed electrode, made preferably of carbon, attached rigidly to the center of the diaphragm.

D is the free electrode, also of carbon. It is suspended from the bracket E on the points $a$ $a'$ by the wires $f f'$, as shown, so as to be free to vibrate. It is preferably so arranged that by its own gravity it will hang in contact with the fixed electrode C, as shown in Fig. 2.

F and F' are the circuit-wires, one, F, being connected to the diaphragm A, through which the current from the wire, F, is conducted to the electrode C. The other wire, F', is connected to the bracket E, thus establishing a circuit-connection with the electrode D through the wires $f f'$ and pivotal points $a$ $a'$.

It is well known that in this class of instruments a yielding pressure must be exerted upon the free electrode to maintain its contact with the fixed electrode on the diaphragm, and that this pressure has to be made adjustable to meet the varying conditions of the electric circuit and the varying force of vocalization employed in using the telephone. This pressure has usually been supplied by a spring or by gravity; but in the use of these agents for the purpose it is difficult to secure that fineness and delicacy of action and adjustment necessary to produce the best results. I have found that magnetism is a much better agent for the purpose. In order to use the magnetic force conveniently and efficiently, I arrange a fixed magnet with its poles in such relation to the free electrode D, which is attached to a piece of iron or other metal susceptible to magnetic attraction, that it (the said electrode) will be drawn and pressed by the magnet into contact with the electrode C. Upon the magnet I place a movable keeper, I, which by being shifted to or from the poles of the magnet will modify their magnetic force.

In the drawings, G is the magnet, which is fixed in its position by being rigidly attached to the door B.

H is the piece of iron to which the electrode D is attached. It projects laterally beyond the said electrode, as shown in the drawings, and acts as an armature to the magnet G. The extremities of the poles $b$ $b'$ of the magnet are placed between the lower edge of the said armature H and the diaphragm A, as shown plainly in Fig. 2. The attraction exerted between the poles $b$ $b'$ of the magnet and the armature H will, as is evident, draw the electrode D into contact with the electrode C with a pressure due to the force of the magnet.

I is a keeper consisting of a flat bar of iron or steel placed upon the magnet, where it will be held by magnetic attraction. According as this keeper is placed nearer to or farther from the poles of the magnet is the magnetic force at the poles less or greater. By these means the contact-pressure of the electrode D upon the electrode C is increased or diminished at pleasure, and thus adjusted to the variations of the electric current or the vocalizing of the operator.

A rabbet may be made in the edge of the armature H, as shown in Fig. 3, and the shoulder of the rabbet arranged directly over the extremities of the poles $b$ $b'$ of the magnet, whereby the magnet will also act to draw the said armature and the wires $ff'$, by which it is suspended from the bracket E, downward, thus insuring continuous and perfect metallic contact at the points $a\ a'$.

The special devices above described for suspending and pivoting the free electrode, while I regard them as new I do not intend to claim them in this specification, but reserve them for a separate patent, for which it is my purpose to apply. Nor do I intend to limit myself here to the said special devices—namely, the bracket E, the wires $ff'$, the points $a\ a'$, and the armature H—as means for suspending or pivoting the free electrode. Any other known suitable devices for the purpose may be used.

I am aware that the magnetic force made adjustable has been employed in a microphone to press the electrodes into contact with one another by means of a magnet and an armature, the armature being attached to one end of a rod of carbon, the opposite end being arranged to rest against the carbon that is fixed to the diaphragm, the said rod being pivoted intermediate its ends on an axle, so that the magnet, acting to attract the armature end of said rod away from the fixed electrode, thereby swings the opposite end toward the diaphragm, into contact with the fixed electrode, and the adjustment is accomplished by moving the magnet nearer to or farther away from the said armature; but this method of employing the magnetic force is objectionable, both because of the inertia of the comparatively large mass of carbon and metal of which the swinging carbon rod and armature must necessarily consist, and because of the jarring and lost motion that are liable to occur at the axial joint. The devices which I have described and to which I limit my claims obviate these objections.

What I claim as my invention, and desire to secure by Letters Patent, is—

1. The combination, in an electric-telephone transmitter, of the diaphragm A, the electrode C, fixed to the diaphragm, the swinging electrode D, to which is attached the armature H, and a magnet G, the poles of which are between the said diaphragm and armature, but not in contact with either, as described, whereby the electrode D is pressed into contact with the electrode C, as and for the purpose specified.

2. The combination of the diaphragm A, to which is attached the electrode C, the swinging electrode D, to which is attached the armature H, the magnet G, the poles of which are between the said diaphragm and armature, but not in contact with either, and the keeper I, placed and held adjustably on said magnet by magnetic attraction, as and for the purpose specified.

3. The combination of the diaphragm A, to which is attached the electrode C, the swinging electrode D, to which is attached the armature H, and the magnet G, the poles of which are between the said diaphragm and armature, the said armature being constructed and arranged relatively to said magnet, as described, whereby the magnet acts to draw the armature downward, as well as toward the diaphragm, as and for the purpose described.

JAMES H. ROBERTSON.

In presence of—
   A. G. N. VERMILYA,
   GEO. W. BEEBEE.